United States Patent

[11] 3,597,939

| [72] | Inventors | Charles C. Ripley;<br>Frederick L. Suckow, both of San Jose, Calif. |
|---|---|---|
| [21] | Appl. No. | 836,360 |
| [22] | Filed | June 25, 1969 |
| [45] | Patented | Aug. 10, 1971 |
| [73] | Assignee | The United States of America as represented by the United States Atomic Energy Commission |

[54] CONTROL ASSEMBLY FOR A NUCLEAR REACTOR INCLUDING AN OFFSET COUPLING
6 Claims, 5 Drawing Figs.

| [52] | U.S. Cl. | 64/1 R, 176/36 |
|---|---|---|
| [51] | Int. Cl. | F16c 3/00 |
| [50] | Field of Search | 64/1, 8, 6, 31; 74/519; 287/100, 53; 176/36 |

[56] References Cited
UNITED STATES PATENTS

| 2,099,359 | 11/1937 | Woodeson et al. | 64/15 |
|---|---|---|---|
| 2,149,435 | 3/1939 | Habach | 287/53 |
| 2,886,358 | 5/1959 | Munchbach | 287/53 |
| 3,060,706 | 10/1962 | Hess | 74/519 X |

*Primary Examiner*—Kenneth W. Sprague
*Attorney*—Roland A. Anderson

ABSTRACT: A control assembly for a nuclear reactor including two control rods operated by a single drive shaft. The control rods and drive shaft are linked by coupling members extending radially from the control rods, one of the coupling members including two spaced arms and the other coupling member including a single arm adapted to fit between the two spaced arms, the drive shaft extending through holes in the coupling members to serve as the hinge pin of the hinge formed by the coupling members, the lower end of the drive shaft and the lowermost arm of the coupling member mating in a Christmas tree coupling. The upper and lower surfaces of the central coupling member are curved convexly to allow for vertical angular deflection between the coupling members without binding.

Patented Aug. 10, 1971

Inventors
Charles C. Ripley
Frederick L. Suckow

Attorney

CONTROL ASSEMBLY FOR A NUCLEAR REACTOR INCLUDING AN OFFSET COUPLING

CONTRACTUAL ORIGIN OF THE INVENTION

The invention described herein was made in the course of, or under, a contract with the United States Atomic Energy Commission.

BACKGROUND OF THE INVENTION

This invention relates generally to couplings and more particularly to a control-rod-drive coupling for operating more than one control rod from a single drive shaft. Specifically, the invention relates to a control assembly for a nuclear reactor including a drive shaft and two control rods, offset therefrom and operated thereby.

As is well known, access to the core of most nuclear reactors is by way of a plug located above the reactor core. It is particularly desirable in a research reactor that this access be unencumbered by control-rod drives passing through the access plug which would have to be disconnected and removed when the plug is removed. This necessitates placing the control-rod drives outside of a relatively large access plug. When, however, the control rods are placed in the reflector surrounding the reactor—as is planned in the Fast Test Reactor of the Fast Flux Test Facility—a large number of control rods are required and there is not room enough around the outside of the plug for the convenient mounting and use of as many control-rod drives as there are control rods. Thus it is necessary to pair most of the control rods so that each pair will be driven by a single control-rod drive.

Since the channels in which the controls run are not necessarily straight, free of twist or parallel with each other, the coupling between the rods and drive shaft must allow the rods to move toward or away from each other, or for the two to twist in a helical manner with no stress to the drive rod. In other words, the control rods should "follow" their respective channels with no detrimental effect on the drive rod.

The pairing of the control rods in this manner also makes it immediately apparent that, unless the control rods and the channels in which they operate are perfect in their dimensions and straightness, potential misalignment must be accommodated by the rod-to-drive couplings in order to ensure that the rods can always scram without interference from friction due to any discrepancies in the alignment. The coupling between the control-rod-drive extension shaft and the control rods must be made offset and must be made in such a manner that the coupling to two control rods does not cause those rods to jam up in any motion, either adjustment or scram. Any coupling between those two rods and their single control-rod-drive extension shaft must be capable of delivering high acceleration on the scram and required deceleration during the damping at the end of the scram stroke. The joint between the extension shaft and this coupling must provide for the requirement of assembling the rods and the shaft into the reactor and any future disassembly for servicing either the control rods, the channels, the control-rod shaft, shaft seal, or the drive. The couplings must resist potential binding due to rotational force couples which are inherent in an offset coupling situation in this type service.

It is accordingly an object of the present invention to provide a control assembly for a nuclear reactor including a plurality of control rods operated by a single drive shaft.

It is another object of the present invention to provide such a control assembly wherein the drive shaft passes through the reactor vessel head and top shield outside of the core access plug and the control rods are offset from the drive shaft toward the center of the reactor and operate in the reflector.

It is also an object of the present invention to develop a coupling which makes it possible to operate two control rods from a single control-rod drive.

It is still another object of the present invention to develop a novel offset coupling which allows remote coupling and uncoupling of the drive extension shaft from the control rods and the control rods from one another.

It is yet another object of the present invention to provide an offset coupling which links two control rods to a single drive extension shaft and accommodates control-rod dimensional variations and misalignment between two control rods and/or their respective channels regardless of whether the channels are bowed, twisted or laterally displaced from one another.

SUMMARY OF THE INVENTION

These and other objects of the present invention are attained with a control-rod assembly that includes a control-rod drive which passes through the reactor vessel head and top shield exterior to the access plug therein and is coupled to two control rods operating in the reflector of the reactor. The coupling includes a pair of coupling members extending radially from the control rods, one of the coupling members including two spaced arms and the other coupling member including a single arm adapted to fit between the two spaced arms, the drive shaft extending through holes in the coupling members to serve as the hinge pin of the hinge formed by the coupling members, the lower end of the drive shaft and the lowermost arm of the coupling member mating in a Christmas tree coupling. The upper and lower surfaces of the central coupling member are curved convexly to allow for vertical angular deflection between the coupling members without binding.

DESCRIPTION OF THE PREFERRED EMBODIMENT

Figure 1:
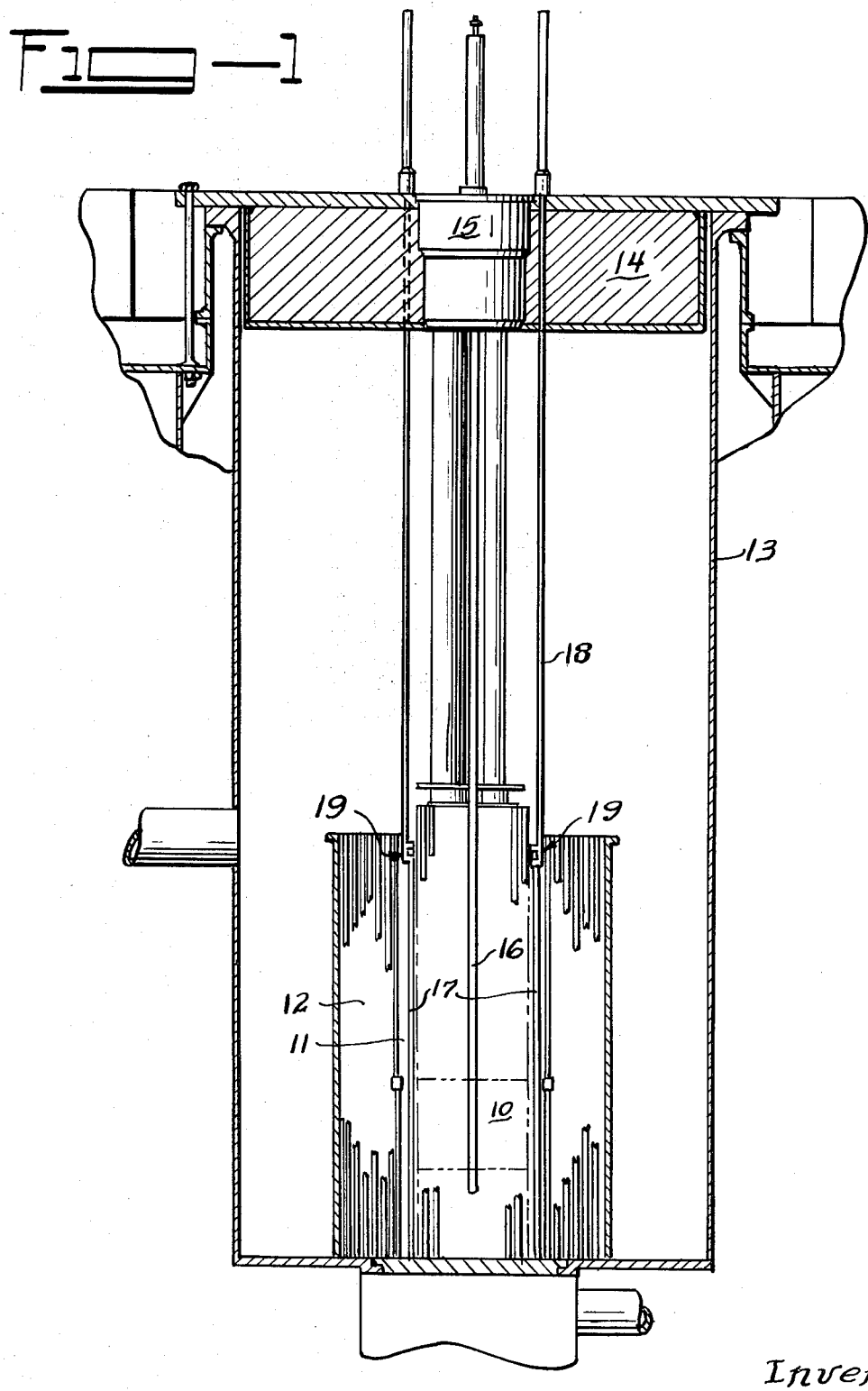
FIG. 1 is a schematic vertical view of a nuclear reactor in which the present invention is incorporated.
Figure 2:
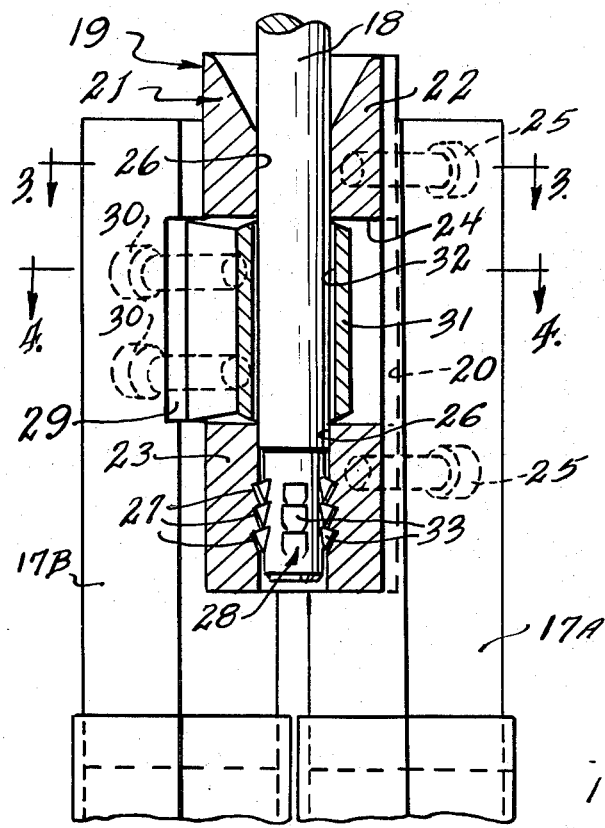
FIG. 2 is a vertical view, partially in cross section, taken on the line 2–2 of FIG. 3, of a control-rod coupling forming an important part of the present invention.
Figure 3:
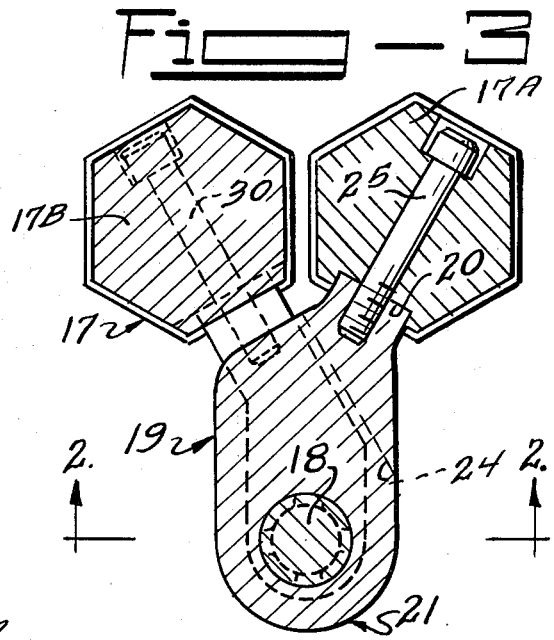
FIG. 3 is a horizontal section taken on the line 3–3 of FIG. 2.
Figure 4:
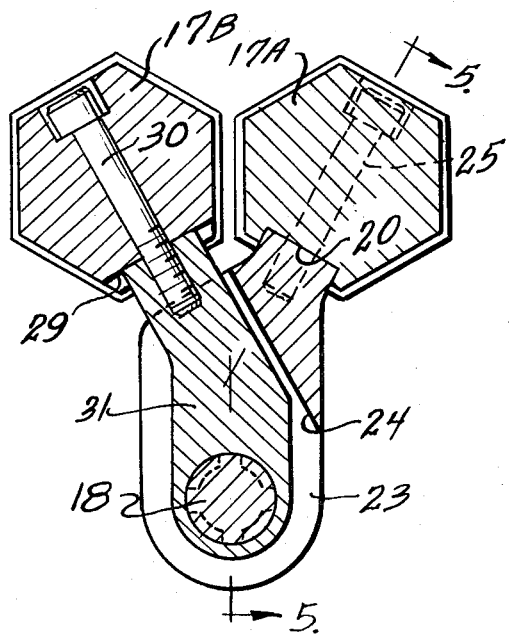
FIG. 4 is a horizontal section taken on the line 4–4 of FIG. 2.
Figure 5:
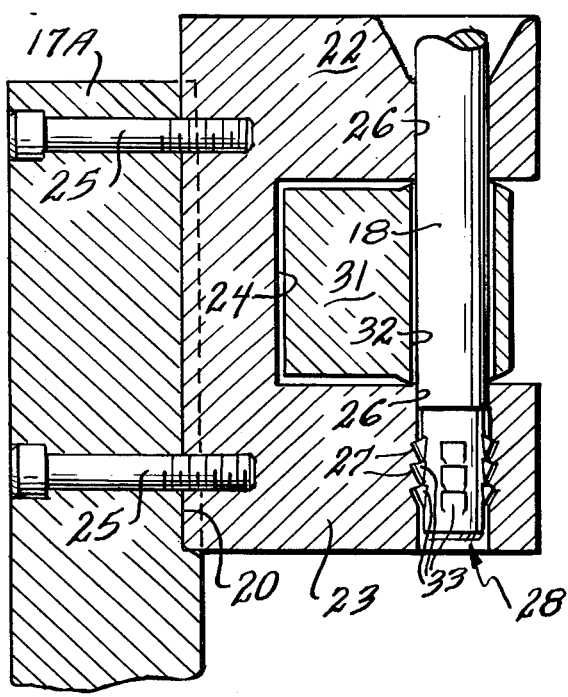
FIG. 5 is a vertical section taken on the line 5–5 of FIG. 4.

Referring now to FIG. 1, a nuclear reactor incorporating the present invention comprises a core 10 surrounded by a reflector 11 and a shield 12 all disposed within a reactor vessel 13. A top head and a shield 12 all disposed within a reactor vessel 13. A top head and shield 14 provided with a central access plug 15 is disposed at the top of the reactor vessel and one or more loops 16 are provided for experimentation. The general construction of the reactor will not be further discussed, since this is not pertinent to the present invention.

The present invention relates to the offset arrangement of control rods 17 which are arranged in a circle in reflector 11, and the control-rod extension shafts 18 which penetrate shield 14 in a circle around access plug 15, and to the coupling 19 which connect these elements. It will be observed that, due to the relative size of the access plug 15 and the reactor core 10, the control-rod drive shafts 18 are offset radially outwardly from the control rods. This arrangement results in control-rod drives which are located radially outward from the access plug opening a sufficient distance to allow the ready removal of the access plug without interference between the plug and the circle of drives.

To make it possible to fit the control-rod drives into the available spaces in the periphery around the access plug 15, most of the control-rod drives operate two control rods. FIGS. 2 to 5 illustrate the coupling by which this linkage is accomplished.

As shown, drive shaft 18 operates two control rods 17A and 17B. Control rod 17A has a slot 20 therein extending along one of the six faces of the control rod and terminating a short distance below the top of the control rod. A coupling member 21 having an upper arm 22 and a lower arm 23 extends radially a short distance outwardly from the control rod and then bends at an obtuse angle. Coupling member 21 extends above the top of control rods 17A, fits into slot 20 and is attached to control rod 17A by two screws 25. Upper arm 22 and lower arm 23 have aligned vertical holes 26 therein, that part of the hole 26 in the upper arm at the top thereof being conical in shape to guide the drive shaft 18 into the hole and the hole 26 in the lower arm having several rows of interrupted triangular-shaped ridges 27 therein constituting the female surface of a Christmas tree coupling 28. Holes 26 are at a location remote from control rod 17A.

Similarly, control rod 17B includes cutaway portion 29 in one of the faces thereof. Extending radially outwardly therefrom and attached to the control rod 17B by screws 30 is a coupling member 31. Coupling member 31 is bent at an obtuse angle and includes vertical hole 32 therein at a location remote from control rod 17B. The upper and lower bearing surfaces of coupling member 31 are curved in a convex fashion to allow for vertical angular deflection between the two members without binding, coupling members 21 and 31 are so designed that coupling member 31 fits radially within slot 24 between arms 22 and 23 of coupling member 21 with all vertical holes being aligned and is restrained vertically by arms 22 and 23. The two couplings thus engage one another in the manner of a hinge that has no hinge pin. Serving as the hinge pin is the end of control-rod extension shaft 18 which has several rows of spaced triangularly shaped protuberances 33 thereon which serve as the male portion of Christmas tree coupling 28.

The control rods are thus coupled to the control-rod extension shaft by mating the coupling members as indicated, pushing the end of extension shaft 18 into the vertical holes 26 and 32 in the coupling members and rotating the drive shaft 45°.

When the two control rods and their couplings have been preassembled into their respective channels, and the control-rod extension shaft is vertically assembled and rotationally locked in the Christmas tree coupling, the relationship between the two couplings, hinge members and the control-rod extension shaft is such that the interrelated surfaces, acting one on another, allow for all the freedom of movement to prevent a jamming due to misalignment, while at the same time providing all of the necessary restraints to ensure that the two control rods actuated through their offset couplings meet all of the criteria outlined in the statement of the problem. Disassembly of the joint is accomplished by simply rotating the extension shaft 45° and pulling it free from the hinge halves.

There is sufficient clearance between the two hinge members in a vertical direction so that no binding results from the slight relative motion allowed between the two elements at their hinge connector junction. Coupling member 21 is dimensioned such as to maintain relatively tight diametral fits with the control-rod extension shaft and Christmas tree coupling. The single radial coupling member 31 which fits between the two arms of coupling member 21 has a relatively larger diametral clearance with the control-rod extension shaft. The grip length of the two arms acting on the extension shaft and the Christmas tree coupling provides a stiff joint for resistance to the detrimental force couple effect due to acceleration and deceleration. The close vertical clearance between the hinge arms 21 and 31 controls lost motion during scram acceleration and damping at stroke end.

It will be understood that the invention is not to be limited to the details given herein but that it may be modified within the scope of the appended claims.

The embodiments of the invention in which we claim an exclusive property or privilege is defined as follows:

1. A control assembly for a nuclear reactor comprising a pair of control rods operated by a single drive shaft, the control rods and drive shaft being linked by coupling members extending radially from the control rods, one of the coupling members including two spaced arms and the other coupling member including a single arm adapted to fit between the two spaced arms, the drive shaft extending through vertically aligned holes in the coupling members, thereby serving as the hinge pin of the hinge formed by the coupling members.

2. A control assembly according to claim 1 wherein the lower end of the drive shaft constitutes the male portion of a Christmas tree coupling and the hole in the lowermost arm of the coupling members constitutes the female portion of a Christmas tree coupling.

3. A control assembly according to claim 2 wherein the upper and lower bearing surfaces of the central coupling member are curved convexly to allow for vertical angular deflection between the two coupling members without binding.

4. An offset coupling for linking two rods to a single drive shaft comprising coupling members extending radially from the rods, one of the coupling members including two spaced arms and the other coupling member including a single arm adapted to fit between the two spaced arms, the drive shaft extending through vertically aligned holes in the coupling members, thereby serving as the hinge pin of the hinge formed by the coupling members.

5. An offset coupling according to claim 4 wherein the lower end of the drive shaft constitutes the male portion of a Christmas tree coupling and the hole in the lowermost arm of the coupling members constitutes the female portion of a Christmas tree coupling.

6. An offset coupling according the claim 5 wherein the upper and lower bearing surfaces of the central coupling member are curved convexly to allow for vertical angular deflection between the two coupling members without binding.